US008966584B2

(12) United States Patent
Hughes et al.

(10) Patent No.: US 8,966,584 B2
(45) Date of Patent: Feb. 24, 2015

(54) DYNAMIC AUTHENTICATION GATEWAY

(75) Inventors: Jeffrey W. Hughes, Green Mountain Falls, CO (US); Andrew L. Bates, Peyton, CO (US); Thomas C. Adams, Colorado Springs, CO (US); Brent W. Maier, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1216 days.

(21) Appl. No.: 11/959,025

(22) Filed: Dec. 18, 2007

(65) Prior Publication Data

US 2009/0158392 A1 Jun. 18, 2009

(51) Int. Cl.
*G06F 21/30* (2013.01)
*H04L 29/06* (2006.01)

(52) U.S. Cl.
CPC ..................... *H04L 63/08* (2013.01)
USPC .......... 726/3; 726/2; 726/4; 726/14; 709/225; 709/226

(58) Field of Classification Search
CPC ..................................................... H04L 63/08
USPC .................... 726/3, 4, 14, 2; 709/225, 226
See application file for complete search history.

(56) References Cited

U.S. PATENT DOCUMENTS

| 6,219,790 | B1 * | 4/2001 | Lloyd et al. ..................... 726/14 |
| 6,466,977 | B1 * | 10/2002 | Sitaraman et al. ............ 709/225 |
| 6,510,236 | B1 * | 1/2003 | Crane et al. ..................... 382/116 |
| 6,959,336 | B2 * | 10/2005 | Moreh et al. ................... 709/229 |
| 7,292,538 | B1 * | 11/2007 | O'Rourke et al. ............. 370/252 |
| 7,320,141 | B2 * | 1/2008 | Hemsath et al. ................ 726/21 |
| 7,421,732 | B2 * | 9/2008 | Costa-Requena et al. ........ 726/3 |
| 7,502,836 | B1 * | 3/2009 | Menditto et al. .............. 709/217 |
| 7,624,193 | B2 * | 11/2009 | Harrison et al. .............. 709/238 |
| 7,681,229 | B1 * | 3/2010 | Ebrahimi et al. .................. 726/4 |
| 7,698,443 | B2 * | 4/2010 | Yaffe et al. ..................... 709/229 |
| 8,201,219 | B2 * | 6/2012 | Jones ................................. 726/3 |
| 2004/0152448 | A1 * | 8/2004 | Passi ............................. 455/411 |
| 2006/0101278 | A1 * | 5/2006 | Kobayashi ..................... 713/182 |
| 2008/0040790 | A1 * | 2/2008 | Kuo ................................. 726/12 |

OTHER PUBLICATIONS

Aphrodite Tsalgatidou, Thomi Pilioura, An Overview of Standards and Related Technology in Web Services, Distributed and Parallel Databases, v.12 n.2-3, p. 135-162, Sep.-Nov. 2002 [retrieved from ACM database on Nov. 15, 2010].*
B. Aboda, P. Calhoun, "RADIUS (REmote Authentication Dial In USer Service) Support for Extensible Authentication Protocol (EAP)", Network Working Group. RFC 3579. The Internet Society (2003). [retrieved from Internet "http://tools.ietf.org/pdf/rfc3579.pdf" on Dec. 19, 2011].*
Metz, C.., AAA protocols: authentication, authorization, and accounting for the Internet Internet Computing, IEEE vol. 3 , Issue: 6. Publication Year: 1999 , pp. 75-79 [retrived from IEEE database on Nov. 5, 2012].*

* cited by examiner

*Primary Examiner* — Saleh Najjar
*Assistant Examiner* — Oleg Korsak

(57) ABSTRACT

A dynamic authentication broker is configured to process authentication requests received from a network access server formatted in any of a plurality of protocols and received over any of a plurality of ports. Processing authentication requests may include authenticating and/or authorizing a particular user, user device and/or network access server.

27 Claims, 3 Drawing Sheets

DYNAMIC AUTHENTICATION GATEWAY

BACKGROUND

Prior to connecting a user device, such as a computer, a personal digital assistant (PDA), or the like to a network device, such as a network server, an email server, a network printer, etc., on a secure network, the user device, or the user employing the user device, generally must be authenticated on the network and/or authorized to access the particular network device. In order to be authenticated, the user or user device will generally send an authentication request to a Network Access Server (NAS). A user may send an authentication request by interfacing with an interactive software mechanism such as a VPN client, an email program, a web page, etc. Alternatively, a user device may transmit an authentication request independently of user intervention, such as by transmitting a request directly using a specified authentication protocol. The NAS may be, for example, a Secure Socket Layer (SSL) based remote access system, a Virtual Private Network (VPN) switch, a firewall switch, a Secure Shell (SSH) based remote access gateway, an Internet Protocol (IP) router, or a modem bank. The NAS may be in selective communication with an authentication server. Generally speaking, an authentication server is a device that receives an authentication request from a NAS and returns a response indicating whether the user device is to be granted access to a requested network or network device, what level of service is allowed on the network or network device, and/or whether a user is properly authenticated. The response may include additional information as well, which may be used by the NAS to determine parameters governing the access provided to the user device.

Traditional authentication servers are generally configured to monitor a single port, and to thereby receive authentication requests communicated using a single authentication protocol. Accordingly, for an authentication system to respond to authentication requests transmitted using more than one authentication protocol, the system may require at least one authentication server for each authentication protocol. Further, some authentication servers may be configured to perform authentication, or authorization, but not both, which may further increase the number of authentication servers required in an authentication system.

DETAILED DESCRIPTION OF PREFERRED EMBODIMENTS

Figure 1:
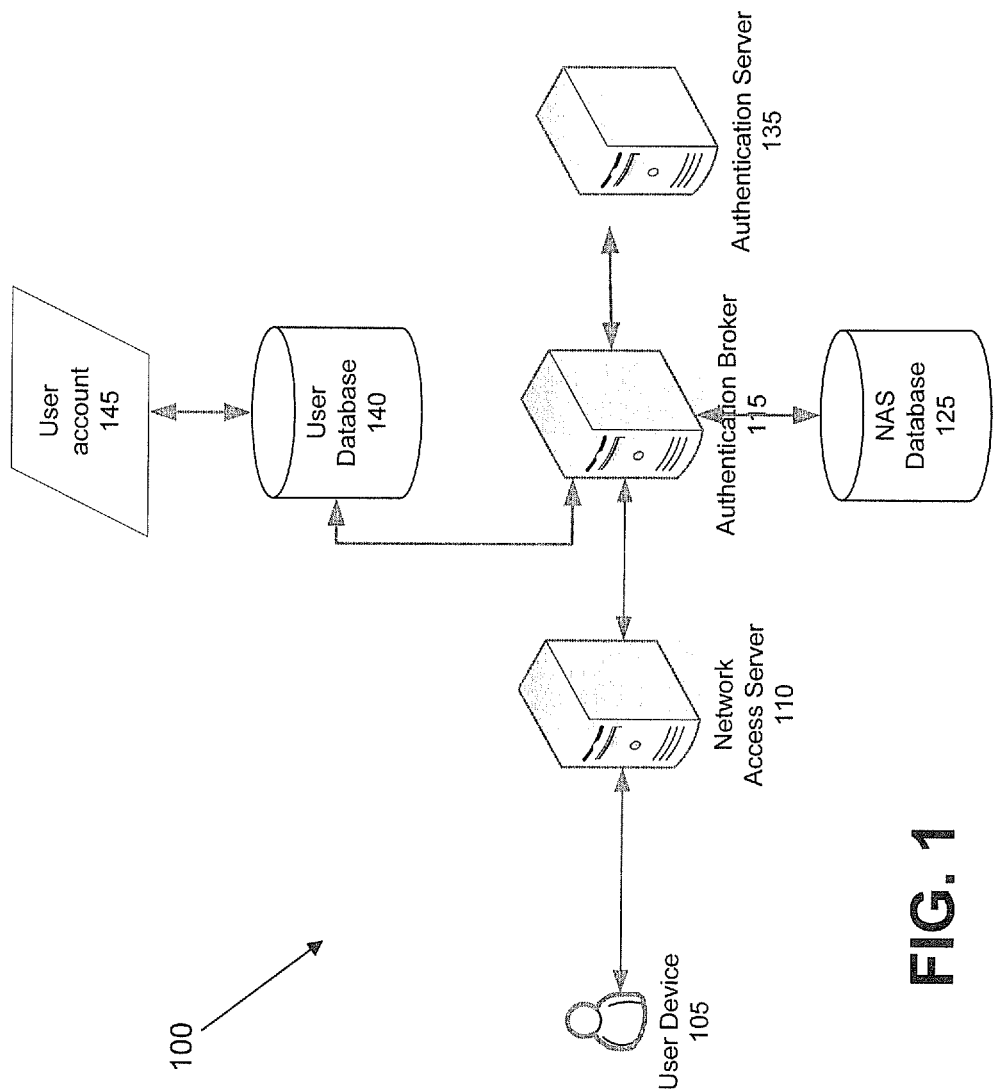
FIG. 1 illustrates an exemplary authentication gateway system.

Generally, an authentication request will include an authorization component and/or an authentication component. The authorization component may be used by the authentication server to determine if a user is authorized to access a device, or to determine what level of service is to be provided to the user. The authentication server may process the authorization component, such as by checking permissions which may be configured for the particular user and/or NAS. An authorization component may include, or may be used to determine, a response, in the form of at least one stored connection attribute indicator returned to the requesting NAS, which the NAS may use to determine, for example, a level of access or authorization for the user, a session time limit, or other variables the NAS may use to apply conditions to a requested access. Such permissions may be stored, for example, on a database or other data storage medium, either locally or external to the authentication server, which storage medium may be selectively accessible by the authentication server. The authentication component may be used to determine if a user is properly authenticated. The authentication component may include user credentials. User credentials may include, for example, a user identifier and an associated password, hardware generated passcode, public key infrastructure (PKI) certificate, etc. The authentication server may process the received credentials through an associated authentication mechanism, such as through comparative queries against a database or other data store, which may be either local or external to the system.

Generally, each user of an authentication server will have an associated user account. An authentication server can generally provide only a single authorization component per user account, regardless of the type of NAS device through which the authentication request is transmitted, or the protocol in which the NAS device makes the authentication request. Accordingly, an authentication system can provide only a single connection attribute indicator, and thus a single level of access for a user, regardless of whether the user accesses the system using multiple types of NAS devices. In some cases, however, a particular NAS can accept only a basic password as an authentication mechanism, while another NAS may require an authentication mechanism having a stronger level of security.

Generally, a given authentication server will be configured to receive authentication requests provided in a single authentication protocol. Many authentication protocols are known, such as the Remote Authentication Dial In User Service (RADIUS) protocol, the Kerberos protocol, the Lightweight Directory Access Protocol (LDAP), the Terminal Access Controller Access-Control System (TACACS), and many others. Authentication requests in a particular authentication protocol are generally communicated over a specific transmission control protocol/user datagram protocol (TCP/UDP) network port as defined by a network protocol, such as IP. For example, authentication requests using the RADIUS protocol are generally directed to (TCP/UDP) port 1812; authentication requests using the Kerberos protocol are generally directed to (TCP/UDP) port 88, authentication requests using the TACACS protocol are generally directed to (TCP/UDP) port 49, etc.

FIG. 1 illustrates an exemplary authentication system 100 which may be useful for processing authentication requests through a plurality of protocols. System 100 includes a user device 105 configured to access a network access server (NAS) 110 for access to a network or network device. NAS 110 may be, for example, a Secure Socket Layer (SSL) based remote access system, a Virtual Private Network (VPN) switch, a firewall switch, a Secure Shell (SSH) based remote access gateway, an Internet Protocol (IP) router, a modem bank, etc.

NAS 110 is generally in selective communication with a dynamic authentication broker 115. NAS 110 is configured to receive user credentials from user device 105 and to selectively provide an authentication request to authentication broker 115. Authentication credentials may include, for instance, a user name and an associated network password, hardware token identifier, PKI certificate, etc. The authentication request, which may be transmitted as a single transmission or a series of transmissions, includes at least the authentication credentials and a NAS identifier, such as the IP address of the NAS 110. NAS 110 is further configured to receive an authentication response from authentication broker 115 indicating whether user device 105 may be granted access to the target network or network device. The authentication response may include additional information, including authorization indicators such as connection attribute indicators, useful for determining the nature of access to be provided to user device 105. NAS 110 will generally be configured to communicate the authentication request to authentication broker 115 using a specific authentication protocol. For example, a first NAS 110 may communicate an authentication request to authentication broker 115 using the RADIUS protocol. Another NAS 110 may communicate an authentication request to authentication broker 115 using the LDAP protocol. Still another NAS 110 may communicate an authentication request to authentication broker 115 using another authentication protocol, such as the Kerberos protocol, etc.

Upon receiving a subsequent authentication response from authentication broker 115, NAS 110 may be configured to use at least a portion of the received authentication response, such as a connection attribute indicator, to set parameters governing the access to be given to the user device 105. For instance, the NAS 110 may use the connection attribute indicator to determine whether access is to be given to the user device 105, the extent to which the user device 105 may access a target network or network device, the duration of the access to be provided to user device 105, etc.

Dynamic authentication broker 115 may include at least one process, or service, running thereon. Each of the at least one services may be bound to a particular and potentially unique port or series of ports, and may be configured to receive incoming authentication requests directed to one of the ports to which it is bound. For instance, in one exemplary approach, authentication broker 115 may include a first service which may be configured to receive incoming authentication requests in the RADIUS protocol directed to port 1812, a second service which may be configured to receive incoming authentication requests in the Kerberos format directed to port 88, and a third service which may be configured to receive incoming authentication requests in the LDAP protocol directed to port 389. Upon receipt of an authentication request, the service may determine at least a NAS identifier and a user identifier from the authentication request. In one approach, as a preliminary step, the service may attempt to validate the identity of the requesting NAS 110. That is, the service may identify the specific NAS 110 transmitting the authentication request, and determine whether the NAS 110 is a trusted device. To determine the validity of a NAS 110 the service may compare the received NAS identifier to a list including identifiers associated with known trusted NAS devices 110. For instance, the service may receive an IP address from a NAS 110, and may compare the IP address to a list of trusted IP addresses. A list of identifiers associated with trusted NAS devices 110 may be stored, for example, on a database selectively accessible by authentication broker 115, such as NAS database 125.

Authentication broker 115 may also be in communication with at least one authentication mechanism, such as authentication server 135. The at least one authentication server 135 may be configured to process authentication requests according to an authentication protocol. The authentication protocol in which the authentication server may process an authentication request may, but need not, be similar to the authentication protocol in which the authentication broker 115, and/or the at least one service thereon, received the authentication request from the NAS 110. In one approach, authentication broker 115 may be in communication with a plurality of authentication mechanisms, which may include a plurality of authentication servers 135, wherein each of the plurality of authentication servers 135 is configured to process authentication requests according to at least one of a plurality of authentication protocols. For instance, a first authentication server 135 may be configured to process authentication requests according to Kerberos authentication protocol, a second authentication server 135 may be configured to process authentication requests according to the LDAP authentication protocol, and a third authentication server 135 may be configured to process authentication requests according to a third authentication protocol, such as the RADIUS protocol.

The service may be configured to determine an appropriate authentication server 135 capable of processing the authentication request. In one approach, the service may determine an appropriate authentication server 135 to validate the authentication request using the received user identifier and the received NAS identifier. For instance, the service may access a data store, such as NAS database 125. The data store may include an identifier which may indicate the authentication protocol to use for the combination of the particular NAS identifier and user identifier. For instance, NAS database 125 may include information indicating the NAS identifier, and a list of associated user identifiers, and may indicate the authentication protocol necessary for authentication requests received from each of the associated user identifiers. NAS database 125 may also include one or more connection attribute indicators associated with a particular NAS 125. Once the service has determined the appropriate authentication protocol through which to process the authentication request, the service may transmit the authentication request to an authentication server 135 associated with that authentication protocol. The authentication server 135 may then process the authentication request. For example, the authentication server 135 may validate the supplied credentials against an internal component such as a text file, database, other internal data structure, or may validate the credentials against an external component such as an external database server, a PKI server, a token server, etc. Authentication server 135 may validate the credentials received from user device 105 and may provide a response to the requesting service on authentication broker 115, indicating whether the credentials have been successfully authenticated.

In addition to communicating with authentication server 135, authentication broker 115, and/or the at least one service running thereon, may also be configured to authorize the user device 105. Authorizing a user device 105 may include providing a connection attribute indicator to NAS 110. NAS 110 may use the provided connection attribute indicator to determine whether user device 105 is to be given access to a particular resource, such as a network or network device, and to determine the nature of the access to be given, such as the duration of the access, the level of access to be given on the resource, etc. Authentication broker 115 may be in communication with one or more user accounts 145, which may be stored on a database, such as user database 140, selectively accessible by authentication broker 115. User database 140 may be incorporated locally with authentication broker 115, or may alternatively be incorporated as an external database, accessible through a database server, a directory server, etc. In one exemplary approach, each user account 145 may be associated with a unique user identifier. The user account 145 may include a single set of connection attribute indicators which may be used to govern all connections by the associated user. Alternatively, user account 145 may include a plurality of connection attribute indicator sets which may be used to govern access by the associated user according to varying conditions. For instance, user account 145 may include a first set of connection attribute indicators to be used when a user accesses the authentication broker 115 over a first NAS 110 or through a first authentication protocol, a second set of connection attribute indicators to be used when a user accesses the authentication broker 115 over a second NAS 110 or through a second authentication protocol, and a third set of connection attribute indicators to be used to govern access when a user accesses authentication server 115 over a third NAS 110 or through a third authentication protocol.

Accordingly, the at least one service may access a user account 145 associated with the received user identifier. The service may then retrieve a set of connection attribute indicators governing access by the user, which may include selecting an appropriate set of indicators based on, for example, the NAS identifier, the authentication protocol, etc. The connection attribute indicator may indicate, for example, whether a particular user device 105 is authorized to access a particular resource, such as a network or network device, and/or the level of service allowed on the device. Upon retrieving the connection attribute indicators, the service may format and transmit an authentication response to NAS 110. The authentication response may indicate, for example, whether the credentials provided by user device 105 have been successfully authenticated by authentication server 135, and may include a connection attribute indicator retrieved from user account 145, which may indicate, at least in part, whether user device 105 is authorized to access the requested network or network device. The service will format the authentication response to include all information required by the NAS according to the protocol in which the authentication request was received, in the form in which it is required. The NAS 110 may then use the received authentication response to designate the level of authorization or access the user will be allowed on the requested resource.

Authentication broker 115 may be configured to receive authentication requests communicated in a plurality of authentication protocols, through a plurality of services. Further, authentication broker 115 may be configured such that additional services may be added to allow the authentication broker 115 to receive authentication requests in additional authentication protocols as they are developed, or as desired.

Figure 2:
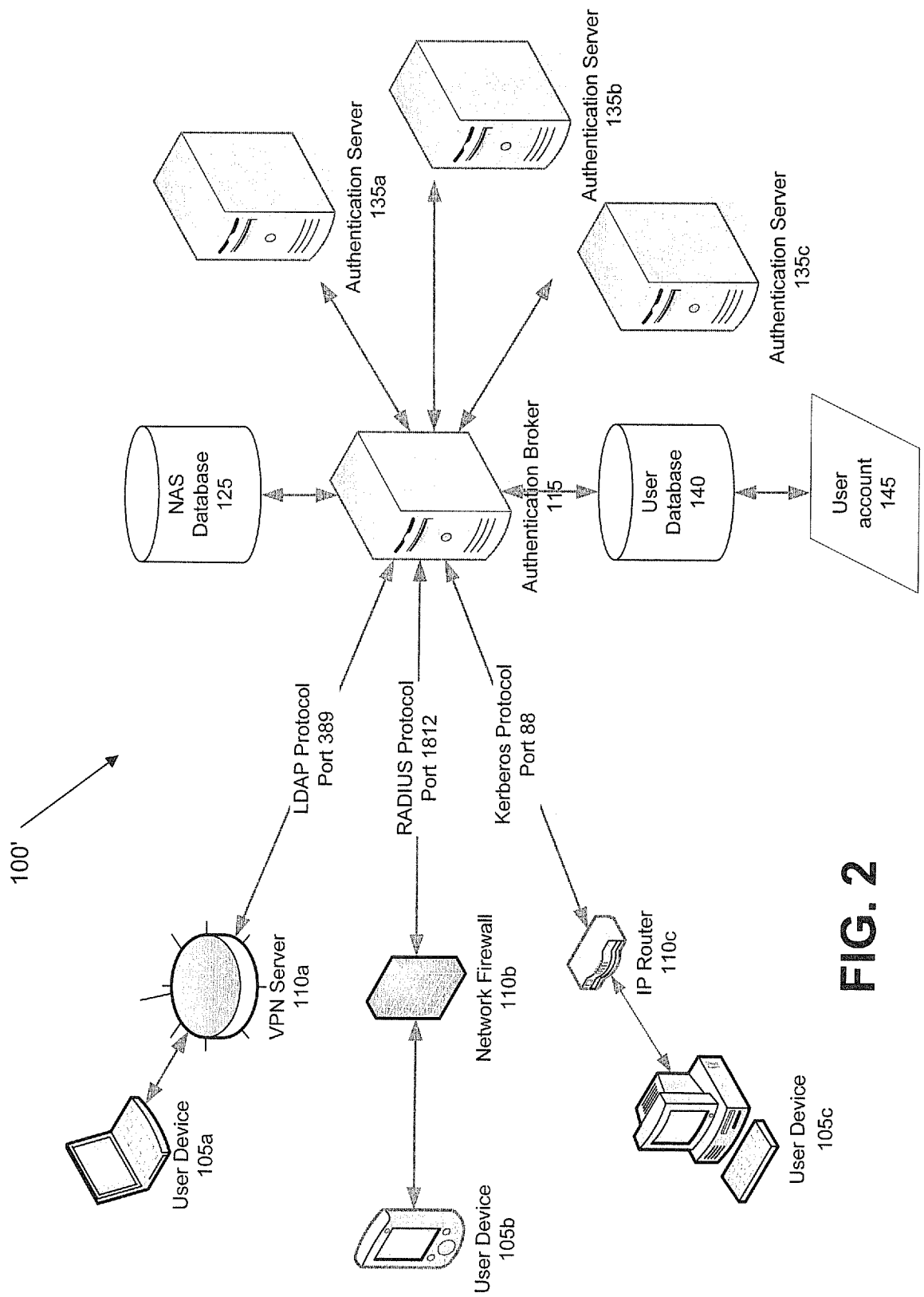
FIG. 2 illustrates an exemplary authentication gateway system.

FIG. 2 illustrates an exemplary authentication system 100' which may be useful for processing multiple authentication requests received from user devices 105 such as mobile computer 105a, PDA 105b, or workstation 105c, in unique authentication protocols from NAS servers 110a, 110b, 110c.

In the exemplary system 100', user devices 105a, 105b, 105c are connected to respective NAS devices 110a, 110b, 110c. NAS 110a is a VPN server configured to communicate authentication requests to authentication broker 115 using the LDAP protocol. NAS 110b is a network firewall device configured to communicate authentication requests to authentication broker 115 using the RADIUS protocol. NAS 110c is an IP router configured to communicate authentication requests to authentication broker 115 using the Kerberos protocol. It is to be understood that while system 100' is illustrated as including three NAS devices 110, this is for purposes of illustration only, and system 100' may include as few as one NAS device 110, two NAS devices 110, or more than three NAS devices 110. Further, while individual NAS devices 110 are shown as each utilizing a unique authentication protocol, it is to be understood that this is by way of example only, and that in a system such as system 100' including a plurality of NAS devices 110, two or more NAS devices 110 may share a common protocol.

Authentication broker 115 includes a plurality of services running thereon. Each service may be tied to one or more ports and may be configured to receive incoming authentication requests directed to the port or ports to which it is bound. In the exemplary approach, a first service may be bound to port 389 and may receive authentication requests from VPN server 110a using the LDAP protocol. A second service may be bound to port 1812 and may receive authentication requests from network firewall 110b using the RADIUS protocol. A third service may be bound to port 88, and may be configured to receive authentication requests from IP router 110c using the Kerberos protocol. Accordingly, the authentication broker may include services bound to each of a plurality of ports and to receive authentication requests regardless of the NAS 110 by which they were communicated, and regardless of the protocol in which they were transmitted. The authentication request will generally include at least a NAS identifier and user credentials, which user credentials may include, for instance, a user name and an associated network password, hardware token identifier, PKI certificate, etc. for the network or device to which user device 105 desires access.

Upon receiving an authentication request from a NAS 110, the service bound to the port over which the request was received may analyze the communication to determine relevant data. For instance, in one approach, a service which receives an authentication request in the RADIUS format, such as from network firewall 110b, may first determine the identity of the NAS 110 and compare and validate the identity against a list of trusted identities, such as by accessing a NAS database 125, to ensure the request originated from an approved NAS 110.

Authentication broker 115 may further be in selective communication with a plurality of authentication servers 135, such as LDAP authentication server 135a, hardware token authentication server 135b, and password authentication server 135c. Server 135 may be physically disposed on one server, multiple servers, or as one or more modules associated with a pre-existing server including, potentially, authentication broker 115. The service that received the authentication request may be configured to determine an appropriate authentication server 135 capable of processing the authentication request. In one approach, the service may determine an appropriate authentication server 135 to validate the authentication request using the received user identifier and the received NAS identifier. For instance, the service may access a data store to retrieve an identifier which may indicate the authentication protocol to use for the combination of the particular NAS identifier and user identifier. Once the service has determined the appropriate authentication protocol, the service may transmit the authentication request to an authentication server 135 associated with that authentication protocol. The authentication server 135 may then process the authentication request. For example, a service may receive an authentication request from IP router 110c transmitted using the Kerberos protocol. The service may determine a user identifier and a NAS identifier, such as the NAS IP address, and determine therefrom that the authentication request must be authenticated using a password authentication module. The service may then transmit the authentication request to password authentication server 135c. The password authentication server 135c may validate the supplied credentials against an internal component such as a text file, database, other internal data structure, or may validate the credentials against an external component such as an external database server, a PKI server, a token server, etc. Authentication server 135 may validate the credentials received from user device 105 and may provide a response to the requesting service on authentication broker 115, indicating whether the credentials have been successfully authenticated.

Services may also be in selective communication with a user database 140 which may contain one or more user accounts 145. The one or more user accounts 145 may include information relating to the user or user device 105 transmitting the authentication request. For instance, a user account 145 may include one or more connection attribute indicators or indicator sets which may be used by the service to authorize the user device 105, and thereby to determine if user device 105 is authorized to access a device. The service may provide the connection attribute indicator or a connection attribute indicator set, to the requesting NAS 110, which may use the received indicator or indicator set to determine the nature of the connection to be provided to the user device 105 upon a successful authentication and authorization. User account 145 may include a single indicator or indicator set governing all access to the requesting user. Alternatively, user account 145 may include multiple indicators or indicator sets governing access to be provided to a user upon authentication in a specific instance, such as when a user connects through a particular NAS 110, or through a particular authentication protocol.

When the service receives a response from authentication server 135, and obtains appropriate authorization parameters, the service creates an authentication response to be transmitted to NAS 110. The connection attribute indicator may be used by the NAS 110 to determine the level and/or nature of the access to be provided to user device 105. The service may format the authentication response to include all of the information required by the authentication protocol utilized by NAS 110, and to provide the information in the format required for the particular authentication protocol. The NAS 110 may in turn communicate with user device 105, such as to provide access to the requested network or network device.

Computing devices, such as those mentioned above, may employ any of a number of known computer operating systems. For example, such devices may use any known versions and/or varieties of the Microsoft Windows operating system; the UNIX operating system (e.g., the Solaris operating system distributed by Sun Microsystems of Menlo Park, Calif.); the AIX UNIX operating system distributed by International Business Machines of Armonk, N.Y.; and the Linux operating system. Computing devices may include any one of a number of computing devices that are known, including, without limitation, a computer workstation, a desktop, notebook, laptop, handheld computer, or some other computing device.

Computing devices generally include instructions executable by one or more computing devices such as those listed above. Computer-executable instructions may be compiled or interpreted from computer programs created using a variety of programming languages and/or technologies known to those skilled in the art, including, without limitation, and either alone or in combination, Java, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

Figure 3:
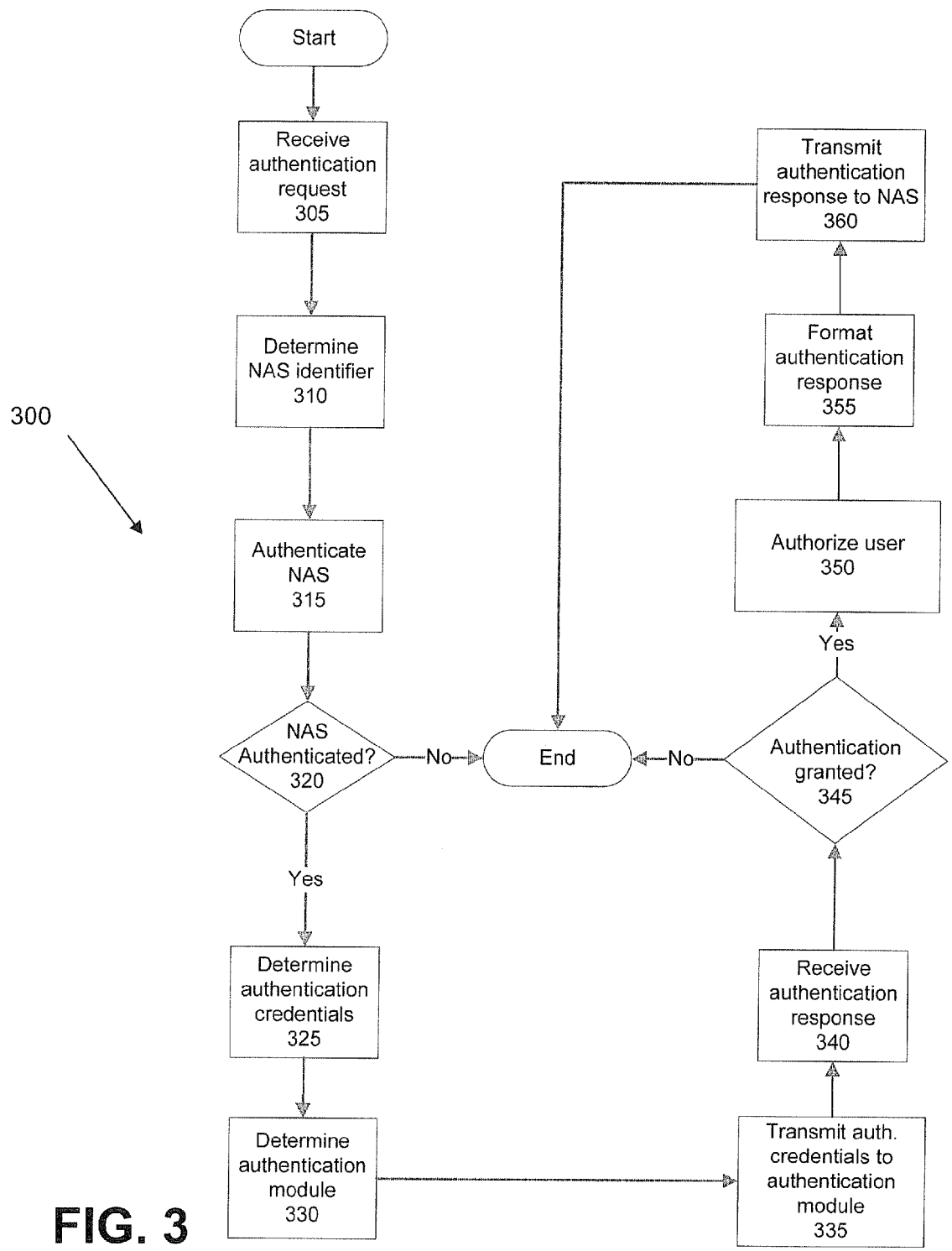
FIG. 3 illustrates an exemplary process for authentication.

FIG. 3 illustrates an exemplary process 300 for receiving and processing an authentication request using a dynamic authentication broker 115, the dynamic authentication broker 115 including at least one service running thereon, the at least one service configured to receive incoming authentication requests in at least one authentication protocol.

At step 305, an authentication request is received by a service running on authentication broker 115. The authentication request is transmitted in a particular authentication protocol, and includes at least user credentials and a NAS identifier.

Next, at step 310, the service determines the identity of the NAS 110 from which the authentication request was received, such as through the received NAS identifier, such as the IP address of the NAS 110, which may be included in the authentication request.

At step 315, the service may then attempt to authenticate the NAS 110. The service may authenticate the NAS 110 by, for example, comparing the received identifier, such as the IP address, of the NAS 110 to a list of identifiers associated with NAS devices 110 approved to authenticate user devices 105 over authentication broker 115.

At step 320, if the NAS 110 is not successfully validated by the authentication broker 115 the service may end the authentication attempt. If the NAS 110 is validated, the authentication request is allowed to continue.

Next, at step 325, the service determines authentication credentials provided as part of the information included in the authentication request received from the NAS 110. The authentication credentials may include, e.g., a user name and an associated network password, hardware token identifier, PKI certificate, etc.

Next, at step 330, the service may determine an authentication server 135, which is configured to process the authentication request. The service may determine an appropriate server by, for example, determining the authentication protocol in which the authentication request may be processed. The service may determine an appropriate authentication protocol by, for example, accessing a database, such as NAS database 125. In one exemplary approach, NAS database 125 may include authentication protocol information for a particular combination of NAS identifier and user identifier.

At step 335 the service communicates the authentication credentials to an authentication server 135, which authentication server 135 may be configured to receive the authentication credentials and to process the authentication request. For example, the authentication server 135 may validate the supplied credentials against an internal component such as a text file, database, other internal data structure, or may validate the credentials against an external component such as an external database server, a PKI server, a token server, etc.

At step 340, the service on authentication broker 115 may receive a response from the authentication server 135, indicating whether the credentials have been successfully authenticated.

At step 345, if the response from authentication server 135 indicates that the user device 105 is not properly authenticated for access to the requested network or network device, the authentication attempt is ended by the service.

If the response from authentication server 135 indicates that user device 105 is properly authenticated for access to the requested network or network device, the service next authorizes the user device 105 at step 350. Authorizing the user device 105 determines whether the user device is to be granted access to the network or network device, and the nature of the access. The service may authorize the user by, for example, selectively accessing a user account 145 on authentication database 140 to retrieve a connection attribute indicator or indicator set governing access by the user device 105. The indicator or indicator set may include parameters specific to user access through the particular combination of user device 105 and NAS 110.

Next, at step 355, the service formats an authentication response according to the protocol required by the request NAS 110. The authentication response may be formatted to include information required by the particular protocol, in the format required by the protocol. The parameters may include, for instance, connection indicators indicative of the nature of access to be provided to the user device 105. The specific parameters required for a particular authentication request may depend in part on the user authorization of step 355, on the type of NAS 110 through which the request is received, and in part on the authentication protocol used by the NAS 110.

Finally, at step 360, the service transmits the authentication response to the NAS 110 in a manner dictated at least in part by the authentication protocol. The NAS 110 may then provide access for user device 105 according to parameters determined in part by the device authorization received as part of the authentication response, which may include the connection parameter indicator.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
    binding each of a plurality of services to one of a plurality of ports on a dynamic authentication broker computing device;
    configuring a first port from the plurality of ports on the dynamic authentication broker computing device to receive authentication requests using a first protocol and a second port from the plurality of ports on the dynamic authentication broker computing device to receive authentication requests using a second protocol;
    receiving an authentication request on one of the plurality of services, the authentication request formatted according to the first protocol;
    selecting, based on at least one identifier associated with the authentication request, by the computing device, a third protocol and an authentication server from a plurality of distinct authentication servers, wherein the third protocol and the authentication server is selected based on a received Network Access Server identifier and a user identifier defined by the one of the plurality of services and further wherein the authentication server is configured to process the authentication request in at least one of the distinct protocols;
    wherein at least one of:
        each bound port from the plurality of ports is limited to a predetermined service, and
        the first protocol is different from at least one of the second protocol and the third protocol; and
    transmitting at least a portion of the authentication request to the authentication server using the third protocol.

2. The method of claim 1, further comprising formatting an authentication response.

3. The method of claim 1, further comprising receiving an authentication response from the authentication server.

4. The method of claim 1, further comprising accessing at least one user account and determining at least one connection attribute indicator from the at least one user account.

5. The method of claim 4, further comprising determining at least one connection attribute indicator from a plurality of connection attribute indicators, the plurality of connection attribute indicators being associated with the at least one user account.

6. The method of claim 1, further comprising formatting an authentication response according to at least one data parameter included in the at least one user account.

7. The method of claim 1, further comprising maintaining a list of trusted Network Access Server identifiers in a database.

8. The method of claim 7, further comprising:
    comparing the received Network Access Server identifier with the list of trusted identifiers in the database; and validating the received Network Access Server identifier in response to the received Network Access Server being included in the list of trusted identifiers.

9. The method of claim 1, wherein the third protocol is different from the first protocol.

10. The method of claim 1, wherein the second protocol is different from the first protocol.

11. The method of claim 1, wherein each bound port from the plurality of ports is limited to a predetermined service.

12. The method of claim 8, further comprising, determining an authentication protocol from the database based at least in part on the Network Access Server identifier and user identifier.

13. A system comprising:
a dynamic authentication broker including at least one computing device and a plurality of services running on the authentication broker, wherein each of the plurality of services is configured to:
receive an incoming authentication request over at least one port in at least one of a plurality of distinct authentication protocols, wherein at least two of the ports use protocols distinct from each other, and
to select, based on at least one identifier associated with the authentication request, an appropriate authentication protocol and authentication server to process the authentication request from a plurality of authentication servers, at least a subset of the plurality of authentication servers being configured to process authentication requests in distinct authentication formats, wherein the at least one identifier includes a received Network Access Server identifier and a user identifier defined by the one of the plurality of services.

14. The system of claim 13, wherein each of the plurality of services is further configured to format an authentication response in one of a plurality of distinct authentication formats.

15. The system of claim 13, each of the authentication servers configured to process incoming authentication requests according to one of the plurality of distinct authentication protocols.

16. The system of claim 13, wherein each service is bound to a particular port.

17. The system of claim 16, wherein each service is configured to receive the incoming authentication request in one of the plurality of distinct authentication protocols.

18. The system of claim 13, wherein the at least one service is associated with at least one user account and further configured to determine at least one connection attribute indicator from the at least one user account.

19. The system of claim 18, wherein the at least one connection attribute indicator may be used to determine the attributes governing a connection provided to a user device.

20. The system of claim 13, wherein the at least one service is associated with at least one user account that includes a plurality of connection attribute indicators, the at least one service configured to select at least one of the plurality of connection attribute indicators based on a user identifier and a connection parameter.

21. The system of claim 13, wherein the at least one service is configured to access a select user account based on the identifier.

22. The system of claim 21, wherein the authentication broker is further configured to format an authentication response based in part on at least one data parameter included in the accessed user account.

23. The system of claim 22, wherein the at least one data parameter includes at least an authentication parameter.

24. The system of claim 13, wherein each bound port from the plurality of ports is limited to a predetermined service.

25. A system comprising:
a dynamic authentication broker including at least one computing device and a plurality of services running on the authentication broker, each of the plurality of services bound to one of a plurality of distinct ports and configured to process an incoming authentication request in one of a plurality of authentication protocols, each of the services further configured to determine at least one identifier from the received authentication request, each of the services further configured to select an authentication protocol and an authentication server based on the at least one identifier,
wherein the at least one identifier includes a received Network Access Server identifier and a user identifier defined by the one of the plurality of services,
the authentication server is configured to process the received authentication request from a plurality of distinct authentication servers,
each of the plurality of distinct authentication servers is configured to process authentication requests in one of the plurality of authentication protocols,
at least one of (1) each bound port from the plurality of ports is limited to a predetermined service and (2) at least two of the authentication protocols used are different, and
each of the plurality of services is in communication with at least one user account and is configured to format an authentication response based on at least one data parameter retrieved from the at least one user account.

26. The system of claim 25, wherein each of the plurality of distinct authentication servers is configured to process authentication requests in one of the plurality of authentication protocols, of which at least two of the authentication protocols are different.

27. The system of claim 25, wherein each bound port from the plurality of ports is limited to a predetermined service.

* * * * *